Patented Oct. 20, 1953

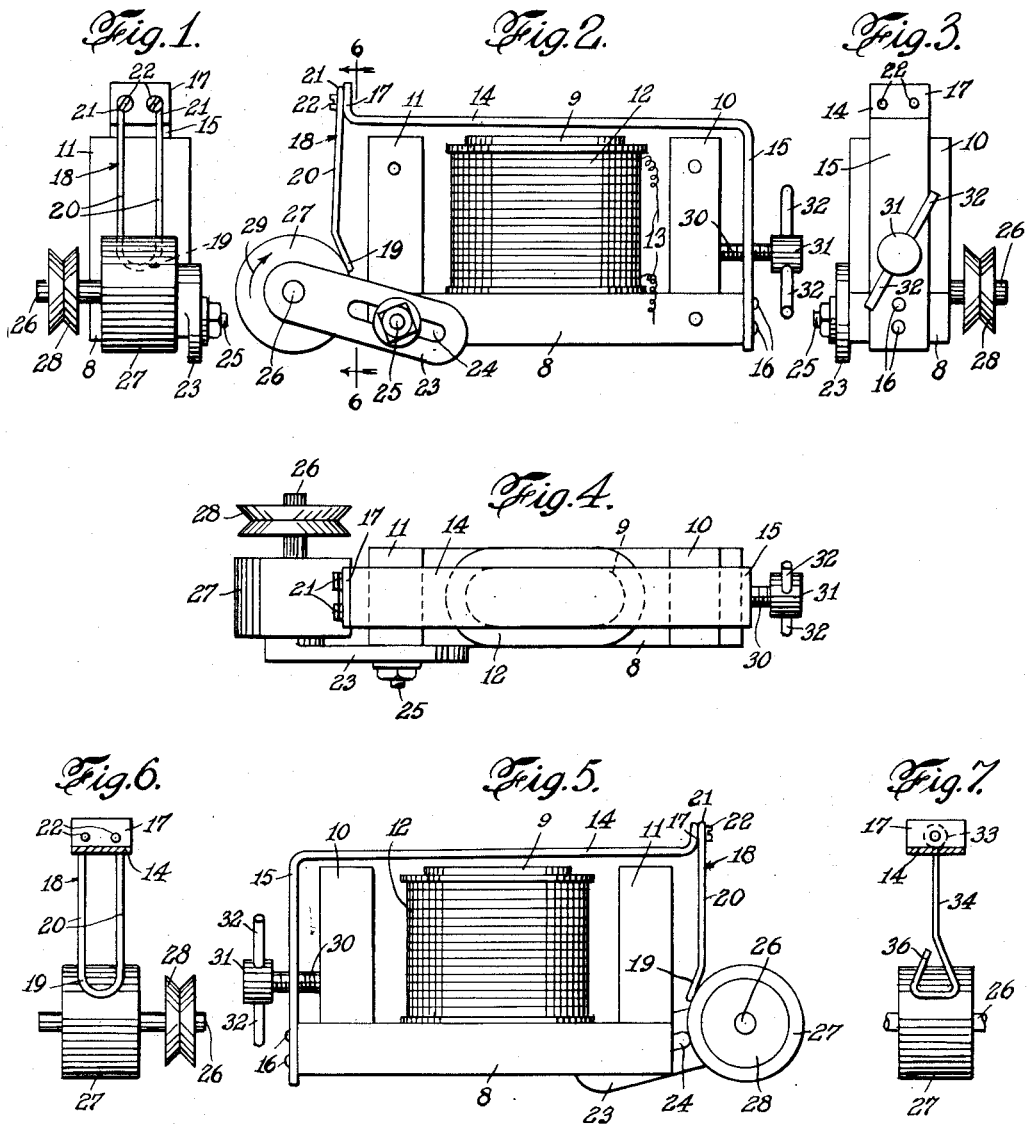

2,656,474

UNITED STATES PATENT OFFICE 2,656,474

VIBRATORY ELECTRICAL MOTOR

Rudolf Hermann Rohden, Bad Lippspringe, Germany, assignor of one-half to Erwin Winkelmann, Ossining, N. Y.

Application July 17, 1951, Serial No. 237,157
In Germany October 11, 1950

3 Claims. (Cl. 310—21)

This invention relates to electric motors and prime movers and particularly to an electric motor that operates by vibration.

The main object of my invention is to provide a vibratory electric motor that is capable of operating on alternating electric current or intermittent direct current to effect rotation of a pulley and thereby deliver power.

Another object of the invention is to have such an electric motor that is simple in construction so that it is not likely to go out of commission.

A further object is to have a vibratory motor of the kind indicated which is adjustable in length of stroke and speed of rotation of the pulley.

It is also an object to have such a vibratory motor made at low cost and light construction so as to be portable.

Yet another object is to provide such a vibratory electric motor with an adjustable mounting for the pulley to facilitate setting it in the most advantageous position with respect to the moving parts of the apparatus.

Other objects and the advantages of my invention will appear in further detail as the specification proceeds.

In order to facilitate ready comprehension of the invention for a proper appreciation of the salient features thereof, the invention is illustrated on the accompanying drawing forming part hereof, and in which:

Figure 1 is front elevation of the vibratory electric motor embodying the invention in a practical form;

Figure 2 is a side elevation of the same motor as seen from the right in Figure 1;

Figure 3 is a rear elevation of the same motor of Figures 1 and 2;

Figure 4 is a top plan view of the motor as seen from above in Figure 2;

Figure 5 is another side elevation of the motor as seen from the left in Figure 1;

Figure 6 is a transverse section taken vertically on line 6—6 in Figure 2; and

Figure 7 is a similar section showing a modification.

Throughout the views, the same reference numerals indicate the same or like parts.

It is well known that electric motors are usually massive and heavy and are therefore more or less unwieldy, and thus scarce-portable. The amount of power delivered is relatively small when compared with the weight and mass of the motor involved. Other serious drawbacks could be enumerated, but it suffices to state that very many motors will not even operate on alternating current which is so prevalent today, so that special motors are usually required everywhere. The cost of a good motor is also an item that cannot be ignored, so that for some purposes at least, a more reasonable prime mover with respect to cost, weight and adaptability is desirable.

Upon duly considering this problem, it has occurred to me that a portable, light weight electric motor could be provided that operates on a vibratory principle and capable of running on alternating current. As a result of such cogitations, I have succeeded in producing a vibratory electric motor that is light, powerful and reasonable in cost, as well as simple construction, as I shall now proceed to elucidate in detail in the following.

Hence, in the practice of my invention, and referring again to the drawing, an elongated base 8 is preferably made of iron and provided intermediate the ends thereof with a vertical iron core 9 rigidly secured on the same. Upon the rear end of the base is fixed a post or stop 10 spaced a short distance from core 9 and upon the forward end is fixed another post or stop 11 also spaced a short distance from core 9, both posts being substantially parallel to the core but slightly shorter than the same.

Upon the core is mounted a coil 12 adapted to be connected to a source of electric current by its terminals 13 through appropriate switch or contact means (not shown), the source being preferably alternating current or intermittent direct current. In order to utilize the intermittently active magnetic field thus produced above core 9, a vibrating armature 14 is mounted above the same in a generally horizontal position, being provided with an integral upright supporting arm 15 secured at the lower end thereof to the rear end of base 8 by means of screws or the like 16. At the forward end of armature 14 is an upturned lug 17 to which is secured the upper end of a metal wire yoke 18 forming a loop 19 at the bottom which is preferably bent slightly toward the front post 11 for a purpose that will immediately appear. The mentioned yoke consists of a pair of wire members 20, 20 terminating at their upper ends in small attachment loops 21, 21 secured by screws 22, 22 to the lug 17 of armature 14.

It is evident that when the intermittent magnetic field of magnet 9, 12 acts on the armature, it will vibrate vertically and thus rapidly raise and lower the yoke 18 with its loop 19 in a useful manner. In this connection, the base is provided with an adjustable bracket 23 having an elongated slot 24 through which extends a screw or bolt 25 secured directly to base 8. At the forward end of the bracket 23 is a stub shaft 26 rotatably mounted thereon and carrying a driven pulley 27 and also an independent driving pulley 28 to which a belt may be connected for delivering power from the motor. The driven pulley 27 is preferably made of resilient material such as rubber, or at least coated with such material or with resilient plastic material and is located in contact with loop 19 of the yoke, so that vertical movement of the loop will frictionally operate to rotate pulley 27 in clockwise direction as indicated by arrow 29 in Figure 2, and consequently rotating driving pulley 28 for power purposes.

In other words, the loop 19 of yoke 18 upon its down stroke drives the plain rubber pulley 27 with a short rotary impulse and then slides past this pulley through its upward stroke, after which it again repeats a driving down stroke, and so on. The rotation of the pulleys is thus substantially a continuous operation so long as the current activates magnet 9, 12.

However, in order to make certain that the desired frictional contact exists between the loop 19 and pulley 27, and also to allow regulation of the armature 14 with respect to speed and intensity of vibration, an adjusting screw 30 is threaded through the supporting arm 15 of the armature and screwed into rear post 10. Upon this screw is fixed a head 31 with fingers 32, 32 for turning it, and thereby causing the supporting arm 15 to approach toward or recede from the post 10, and thus regulate both the armature and the degree of friction pressure exerted by loop 19 on pulley 27 during the down strokes of the armature and the driving loop.

While I have described the driving member specifically as a wire yoke 18 having the two members 20, 20 secured at their upper ends by screws 22 to the lug 17 on the armature and formed into the driving loop 19 at the bottom, yet it is easily possible to modify this structure, as even shown in Figure 7. In that view, armature 14 has a small attachment loop 33 forming the upper termination of a single wire member 34 and secured to lug 17 by a screw 35. The lower end of this wire member is formed into a triangular loop 36 engaging against pulley 27 for driving the same during vibration of the armature. In any case, the driving loop is of wire, which may be steel, for example, and drives the pulley in one direction while slipping past the same in the opposite direction and thus effecting rotation.

From the foregoing, it is evident that the motor described is simple in construction, reasonably light in construction, and not only effective in operation, but also unlikely to get out of order.

The current reversals of alternating current will obviously operate the motor automatically without any special means being introduced or used for adapting the motor for such current.

Manifestly, variations may be resorted to and parts and features may be modified or used without others within the scope of the appended claims.

Having now fully described my invention, I claim:

1. A vibratory electric motor adapted to be operated by alternating electric current or intermittent direct current, including a base, an electromagnet fixed upright upon the base, an armature having an upstanding portion secured at its lower end to the base and having a second generally horizontal portion fixed at one end to the upper end of said upstanding portion and extending over the electromagnet to be attracted thereby, a pendent yoke secured at its upper end to the other end of the generally horizontal portion of said armature and movable vertically with said armature in response to magnetic impulses of said electromagnet, a bracket fixed upon said base and forming a bearing, a shaft rotatably mounted in the bearing and having a pulley with resilient frictional surface material thereon disposed normally in contact with the lower end of said yoke to be driven unidirectionally thereby upon vibration of said yoke, and means for adjusting the position of said armature and yoke for effective engagement of the latter with the surface of the pulley.

2. A vibratory electric motor according to claim 1, wherein the means for adjusting the armature and yoke includes a post rigidly fixed upright upon the base intermediate the upstanding portion of the armature and the electromagnet, and an adjusting screw extending transversely through the mentioned portion of the armature and screwed into said post adjustably.

3. A vibratory electric motor according to claim 2, wherein a second post of equal height with that of the first mentioned post is fixed upon the base intermediate the electromagnet and the pendent yoke to form a stop preventing excessive downward movement of the armature and yoke during operation.

RUDOLF HERMANN ROHDEN.

References Cited in the file of this patent

UNITED STATES PATENTS

| Number | Name | Date |
|---|---|---|
| 1,816,102 | Waters | July 28, 1931 |
| 2,451,840 | Lewandowski | Oct. 19, 1948 |

FOREIGN PATENTS

| Number | Country | Date |
|---|---|---|
| 452,668 | Great Britain | Aug. 27, 1936 |